Patented Feb. 12, 1935

1,990,818

UNITED STATES PATENT OFFICE 1,990,818

COLOR, PLASTIC, AND COATING COMPOSITIONS

Lloyd C. Daniels, Crafton, and Alphons O. Jaeger, Mount Lebanon, Pa., assignors, by mesne assignments, to American Cyanamid & Chemical Corporation, a corporation of Delaware No Drawing. Application December 20, 1930, Serial No. 503,855

9 Claims. (Cl. 134—79)

This invention relates to colored plastics and coating compositions and to methods of preparing the same.

In the past, in the preparation of colored materials of this type, it has been considered necessary to prepare the coloring material independently of the plastic and to incorporate it after preparation by means of mechanical methods, such as oil grinding. This has added considerably to the cost of such colored compositions, as is shown by the present high prices of oil pigments.

According to the present invention, such pigments are formed in the solvents used in preparing the plastic or coating composition by the reaction of a lake-forming dye and a metal compound. In order to form uniform colors by this method both the metal and the dye must be in such form as to be either in true or colloidal solution in at least one of the solvents used in preparing the desired composition. This solvent may be the composition itself, as for example in the preparation of clear varnishes and the like, or it may be a solvent for both the plastic and the components of the color material as in the preparation of colored lacquers and enamels, or it may consist of or include one or more independent organic solvents which are soluble in or compatible with the solvent for the plastic material.

In the formation of uniformly colored materials the desired color-lake may be formed in the presence of the plastic or film-forming material or it may be formed by reaction of a lake-forming dye and a compound of a lake-forming metal in a solvent or mixture of solvents which is identical with or compatible at least in part with the solvent to be used in the formation of the desired composition, or with the composition itself. For such purposes, as has already been explained, both the dye and the metal compound must be in either true or colloidal solution in one or more of the organic solvents, and for this reason the range of metal compounds that can be used for this purpose is somewhat limited. We have found, however, that many of the organo-metallic compounds are sufficiently soluble in organic solvents to be useful for this purpose, and that one particular class, namely, the non-alkali forming metal salts of salt-forming compounds containing the keto group, such as keto acids, keto-esters, 1-3 diketones and keto nitriles, exhibits the remarkable property of being at least partly soluble in almost all the organic solvents used in the paint and lacquer industry. This class of salts, as has been brought out in the prior application of L. C. Daniels, Serial No. 476,715 filed August 20, 1930, is compatible with most solvents by reason of the presence of the keto group, which appears to have the effect of producing solubility in ester solvents, alcohols, hydrocarbons, and many other classes of solvents in commercial use in this field. We have found, however, that in addition to the salts of keto acids, esters, nitriles, 1-3 diketones and the like, metal compounds of other types can also be used, for example salts of aliphatic acids, such as zinc stearate and the like, ester salts, such as zinc-ethylphthalate, and the neutral zinc phthalate described in the prior application of L. C. Daniels, Serial No. 476,243 filed August 18, 1930. The metal compounds belonging to these other classes are by no means limited to zinc salts, but on the contrary any lake-forming metal may be used that can be prepared in a form that will be soluble in a suitable organic solvent.

In a similar manner, any lake-forming dye may be used that is soluble in an organic solvent compatible with the plastic and coating compositions or with the solvents used in preparing them. The principal dyes of this class are the hydroxyketone, hydroxyquinone and hydroxylactone dyes and the anthraquinone substances, the alizarine colors being of particular value. Other lake-forming dyes, such as azo dyes and the like may also be used, and any combination of these various colors may be employed to give the desired shade as is well known to those skilled in the art. The class of lake-forming dyes that are soluble in organic solvents suitable for use in the present invention is very large, practically the only notable exception being those containing a sulphonic acid group, and even among these certain exceptions may occur.

By the suitable choice of lake-forming dyes and metal compounds almost any desired color effect may be produced by the present invention. Of the anthraquinone colors, for example, alizarin produces orange red lakes with zinc, the color being suitable for use both in films and in plastics which are to be subjected to high temperatures. Alizarin brown may also be used and gives an orange brown lake when reacted with chromium compounds, orange red with aluminum and reddish purple with iron. For the preparation of films or molded resins capable of withstanding higher temperatures such colors as anthracene brown, purpurin, alizarin bordeaux R, alizarin DCA, alizarin SC, alizarin maroon and the like may be used, giving shades that range from brown through maroon, bluish red, bluish violet, and scarlet with aluminum and chromium.

Hydroxy-ketone, -quinone and -lactone colors may include such dyes as alizarin yellow A, which produces a golden yellow lake with aluminum and gray with iron, resoflavine W, galloflavine and alizarin yellow which produce varying shades with chromium compounds, as do alizarin black S, alizarin black WX and alizarin dark green W. These colors find their chief uses in the preparation of lacquers and varnishes.

Nitro, nitroso and azo colors, the use of which should be restricted to films, may be used and include such dyes as pigment chlorine C. G., lithol fast yellow GG, gambine B and gambine R, which give green and brown with iron and chromium respectively; such mono-azo colors as brilliant lake red R, chrome printing yellow G, chrome printing orange R, paranitraniline red, which gives a bright vermilion with barium compounds, pigment orange L, chrome deep brown 3R and tuscaline orange G., as well as disazo and trisazo compounds such as chrome fast yellow G, chlorazol fast yellow 5GK and alizarin yellow F. S.

Dyes of other classes may also be used, such as the pyrazolone compounds, e. g. pigment chrome yellow L; di- and triphenylmethane substances as turquoise blue G, brilliant green, chrome green and the like. The range of dyes that may be used is very large, and the invention is not limited to the foregoing, which have been given by way of example only. The particular dye or dye mixture and metal compound will be selected in each case by the skilled chemist to produce the desired color effect.

In general it is to be noted that for the formation of lacquer, varnish and enamel films the only requisite of the dye is that it must form a suitable color, but in the preparation of most colored resins and other plastic substances that must be hardened by heat a dye that is resistant to high temperatures should be chosen. In addition to the lake-forming dyes which are prepared in situ, other colors may be used in the formation of the composition, and the invention is not limited to colored plastic and coating compositions which contain only color lakes.

In the reaction between the dye and the metal compound by which the color-lake is formed, some acidity may develop. For example, in the reaction between an alizarine dye and aluminum benzoyl benzoate, benzoyl benzoic acid is produced in the solvent. In such cases it may be desirable to add to the solution of at least one of the components small amounts of an organic base, such as triethanolamine, quinoline, pyridine, etc. In many cases the neutralization of this free acid can be turned to advantage by using a metal salt of an acid which will form a plasticizer with the base added, for example in the case above noted the triethanolamine forms a plasticizer by reaction with the benzoyl benzoic acid. Plasticizers can also be formed by esterifying the free acid with alcohol, many of the lake-forming metals also serving as esterification catalysts.

Since different shades and in many cases different colors are produced by reaction of different metals with a single dye, it is often convenient to use mixtures of metal compounds, either of the same or of different organic acids, and similarly it is often desirable to use salts of metals which do not by themselves form lakes with the dye, in conjunction with the lake-forming metal. For example, the presence of calcium in the formation of a chrome-alizarin lake produces a triple color lake of chromium, calcium, and alizarine which is much brighter in shade than the usual chrome alizarine lake. The lake-forming metals to be used in the present invention are not materially different from those ordinarily used for this purpose, the chief ones being iron, chromium, aluminum, zinc, copper and manganese, and any suitable metal may be used.

In preparing the colored plastic and coating compositions of the present invention any of the customary vehicles and solvents may be used, with or without the addition of special solvents for the metal and dye components. For colored lacquers such as nitrocellulose lacquers, pyroxylin lacquers and the like such solvents as ethyl, amyl or butyl acetate together with cheaper solvents and thinners such as toluol, benzol and the like may be used, as well as "pentacetate" (a mixture of acetates of the various isomeric amyl alcohols). For clear varnishes the usual drying oils such as linseed oil, tung oil and the like are used, and the dye forming components may be either taken up in these substances or may be dissolved in alcohol or other solvent and mixed with the drying oil during preparation of the varnish. Where drying oils are used certain of the metal compounds such as those of Co and Mn may accomplish a double purpose, viz. lake-forming and drying acceleration. Where opaque varnishes or enamels are to be prepared opacifying agents or whiteners such as titanium white, zinc white, lithopone, and the like may be used, although it is to be noted that in some cases there may be a tendency for the lake-forming dye to react with the zinc or other metal components of these substances and produce an off color. In such cases the lake is first formed in another portion of the solvent and is then admixed with the whitening agent during formation of the finished product.

The preparation of lacquers and lacquer enamels forms one of the most important fields of application of the present invention. By reason of the enormous number of lake colors that can be prepared and incorporated in such coating compositions without the necessity of oil grinding or other expensive mechanical treatment the possibilities of development in this field are greatly extended, and the possibilities of preparing intimate mixtures of various dyes permits the preparation of many new color effects. In the preparation of the lacquer enamels, or other enamels where an opacifying agent is to be used, the lake can be formed from solutions, one of which contains the pigment in suspension or in colloidal solution in such a manner that the lake is uniformly impregnated into the pigment and forms with it a homogeneous color. Pigments for paints may also be prepared in this manner, by adsorbing a freshly formed lake into the pores of porous, finely divided substances such as kieselguhr and the like.

As has already been stated, the range of metal compounds and dyes that are soluble in organic solvents is a wide one, and for this reason the present invention may be used to advantage with almost any of the solvents now in use in the preparation of lacquers and varnishes. Alcohols, while not ordinarily considered as good solvents for lacquer forming substances of the pyroxylin type, are almost universally used in the preparation of such lacquers, and as many lake-forming dyes and organo-metallic compounds are soluble in alcohols the use of this class of substances forms one of the methods of application of the present invention. Similarly the ester and ketone solvents can be used, these presenting the advantage of being both good solvents for lacquer forming substances of the pyroxylin or nitrocellulose type and also for many lake-forming dyes and metal salts of organic acids, particularly the metal salts of keto acids. In cases where hydrocarbons or other non-solvents for pyroxylin substances are to be used as thinners, the use of metal salts of keto acids in forming lake colors according to the present invention is of exceptional value, as the keto acid compound produced by the reaction has the property of increasing the toluol or other cheap solvent tolerance and thus permits higher percentages of total solids in the lacquer.

In the preparation of plasticized lacquers the plasticizer may also form a solvent for one or both of the components of the color-lakes, especially where such plasticizers as dimethyl, diethyl or dibutyl phthalates, zinc ethyl phthalate are used, or the keto acid esters of non-resinophoric alcohols described in the application of A. O. Jaeger, Serial No. 395,966 filed September 28, 1929.

The present invention can also be employed in the preparation of molded plastic compositions, either with or without the use of plasticizers and modifying agents such as the natural or synthetic drying oils, semi-drying oils and non-drying oils. The range of plastic compositions which can be so used is very large, and includes such resinous materials as the phenol-aldehyde resins, ketone resins, urea and thiourea resins, furfural and furfural-phenol resins, resins produced by the polymerization of hydrocarbons such as indene, petroleum fractions, wood tars and the like and vinyl and styrol polymers and polymers of other unsaturated hydrocarbons. Polymers of oxygen containing compounds such as cumaron and the like, halogen containing bodies such as halogenated rubber, and nitro resins such as those resulting from the nitration of asphaltic and petroleum distillates can also be produced in colors by the use of the present invention. The so-called ester gums as well as the copal resins may also be used to advantage in conjunction with lakes produced by the present invention, either when dissolved in suitable solvents to form lacquers or varnishes or in the form of molded plastics. One of its most important uses is in conjunction with resins of the polyhydric alcohol polybasic acid type such as the glyptal resins and the like where by the use of dyes capable of withstanding temperatures up to 150–160° C. many highly colored resins of beautiful appearance may be obtained. In the preparation of such resins the lake colors may be produced in the A-stage resin, or they may be formed in the plasticizer in case a plasticized resin is to be prepared. The constituents of the lake colors can also be introduced in the usual solvents for such resins when it is desired to produce colored insulating varnishes, enamels and the like.

The invention will be further illustrated by the following specific examples, but is in no way limited thereto.

*Example 1*

A mixture of 28 parts by weight of glycerol and 72 parts of phthalic anhydride are heated slowly to 180–200° C. during two hours. The heating is continued until the reaction is complete and the A-stage resin has been formed, after which a solution is added containing 50 parts of aluminum benzolybenzoate, dissolved in sufficient dibutyl phthalate to be just stirrable and sufficient pyridine, triethanolamine or other organic base to neutralize the free benzoylbenzoic acid. Heating is continued with stirring until a uniform solution is obtained, after which 25 parts of a 1% solution of alizarin orange in alcohol is stirred in. A beautiful orange red color is developed which is soluble in the resin and perfectly clear. The colored resin may be hardened by further heating and molded to produce a colored resin product, or it may be dissolved in a solution consisting of 30 parts of ethyl acetate, 30 parts of toluol and 40 parts of acetone and used as a colored varnish which does not need to be baked on.

*Example 2*

A phenol-formaldehyde condensation product is prepared by heating the components in the ratio of 1 mol formaldehyde to 6–7 mols phenol, with or without the use of accelerators, until the product separates into layers. The resinous layer is collected and dried and mixed with an equal weight of ferric naphthoylbenzoate heated with about 7% of dibutyl phthalate. After uniform incorporation, small amounts of alizarin red are worked in, the incorporation being assisted by the addition of small amounts of acetone if desired. A dark blue product is obtained, which can be mixed with sufficient wood flour or other filler to produce a composition of the desired consistency and molded at temperatures of 160–200° C., followed by baking at 150 to 180° C.

*Example 3*

To an acetylcellulose lacquer prepared by dissolving 100 parts cellulose acetate in 300–500 parts acetone with the addition of 10 parts monobrombenzol and 20 parts butyl acetate is added a solution of 15 parts aluminum benzoylbenzoate in acetone. 2–5 parts alizarin Bordeaux are dissolved in alcohol and added to the clear lacquer, producing a violet red shade that is completely soluble and produces a lacquer film having a high luster.

*Example 4*

A solution of a color-lake is prepared by dissolving 6 parts zinc benzoylbenzoate and 3 parts triethanolamine in 1 portion of the ethyl alcohol, 0.5 to 1.5 parts alizarin red in another portion of the alcohol, admixing the two to produce a solution having a brilliant red coloration. This solution is added to a cellulose lacquer, for example one prepared by dissolving 1 part cellulose ether in 3½ parts ethyl lactate and 3½ parts ethyl alcohol.

Solutions of other color-lakes may be prepared in a similar manner by reacting alcohol solutions of organo-metallic compounds with alcohol solutions of lake-forming dyes, for example the aluminum or chromium salts of benzoylbenzoic acid may be reacted with anthracene brown, alizarin yellow-A, alizarin dark green W, and the like. The preparation of solutions of the color-lakes forms a very important feature of the present invention since in this manner stock solutions of the various colors may be prepared and used in the preparation of different varnishes and enamels having different properties and the independent preparation of such solutions permits blending to produce any desired shade.

Example 5

Ferric chloride is added to a solution of acetoaceticester in alcohol until a violet color is produced. A solution of alizarin in alcohol is added, and the dark blue color lake is used in coloring a cellulose lacquer, for example, one of the type described in Example 4.

Example 6

To a concentrated solution of 35 parts zinc benzoyl benzoate in alcohol, sufficient alizarin is added in alcoholic solution to form the red color-lake. Excess alcohol is removed by boiling and 35 parts nitrocellulose are mixed in, after which 10 parts camphor and 20 parts methyl benzoyl benzoate, dissolved in alcohol if necessary, are added. The ingredients are thoroughly admixed by passage through differential steam heated rollers and formed into sheets in the usual manner. The resulting product is a deep red plastic, similar to celluloid but much less inflammable, and much more resistant to heat and ignition.

Celluloid and similar products can be prepared in any desired color by processes similar to the above, the color depending on the dye chosen and the physical characteristics of the product depending on the proportions of the ingredients chosen. Where non-inflammability is not of primary importance, only sufficient of the metal compound may be used to form the color-lake, and other plasticizers may be used instead of or in conjunction with the methyl benzoylbenzoate. Similarly, mixtures of different colored plastics may be incorporated to produce vari-color effects, as has been done with colored plastics of other types.

Example 7

A 1% solution of aluminum benzoyl benzoate or naphthoyl benzoate in linseed oil is prepared and admixed with a second part of linseed oil containing equivalent amounts of alizarin.

The mixture may be boiled to produce a clear varnish, with or without the addition of a dryer such as manganese dioxide, cobalt dryer or the like.

If an opaque varnish is desired, opacifying agents such as alumina, zinc white, titanium white, white lead, lithopone, etc. are added to the mixture before boiling, and heating is continued until a sufficient adsorption of the color lake has been obtained.

Example 8

A modified glyptal resin is prepared by the reaction of phthalic anhydride, glycerol and rosin or other substance containing natural resin acids such as abietic acid and the like. While in its soft form, the material is incorporated with small amounts of a non-alkali-forming metal salt of benzoyl or naphthoyl benzoic acid, such as the aluminum salt and a solution of a lake-forming dye in an organic solvent such as alcohol, diethyl or dibutyl phthalate is stirred in to produce a colored resinous material. The resin may then be hardened by heat or it may be dissolved in solvents and used as a coating composition.

In the foregoing examples, representative plastics and coating compositions have been described, which are suitable for any of the uses to which these substances may ordinarily be put, and which have in addition the added characteristic of bright and permanent colors. The varnishes which have been described, for example, can be used either as varnish stains or as varnishing coats over priming coats of white or pigmented material, or the colored varnishes themselves may underlie a finishing coat of clear varnish. The invention is not limited to any specific use of the materials which have been described, but on the contrary it is to be understood that they will be used by the skilled chemist wherever compositions having their required characteristics are needed.

What is claimed as new is:

1. A composition comprising the reaction products obtained by mixing a solution of a non-alkali forming metal salt of a keto acid in an organic solvent with a solution in an organic solvent of a dye capable of forming a lake with the metal of the keto acid salt, said reaction products being characterized by their ability to remain dispersed in the solvents wherein they were formed.

2. A composition comprising the reaction products obtained by mixing a solution of a non-alkali forming metal salt of a keto acid in an organic solvent with a solution in an organic solvent of a dye capable of forming a lake with the metal of the keto acid salt and an organic base in amount sufficient to neutralize the keto acid set free, said reaction products being characterized by their ability to remain dispersed in the solvents wherein they were formed.

3. A composition comprising an organic plastic and the reaction products obtained by mixing a solution of a non-alkali forming metal salt of a keto acid in an organic solvent with a solution in an organic solvent of a dye capable of forming a lake with the metal of the keto acid salt, said reaction products being characterized by their ability to remain dispersed in the solvents wherein they were formed and thereby to become uniformly dispersed in the plastic.

4. A composition comprising an organic plastic and the reaction products obtained by mixing a solution of a non-alkali forming metal salt of a keto acid in an organic solvent with a solution in an organic solvent of a dye capable of forming a lake with the metal of the keto acid salt, and an organic base in amount sufficient to neutralize the keto acid set free, said reaction products being characterized by their ability to remain dispersed in the solvents wherein they were formed and thereby to become uniformly dispersed in the plastic.

5. A coating composition comprising a solution containing an organic film forming substance and the reaction products obtained by mixing a solution of a non-alkali forming metal salt of a keto acid in an organic solvent with a solution in an organic solvent of a dye capable of forming a lake with the metal of the keto acid salt, said reaction products being characterized by their ability to remain dispersed in the solvents wherein they were formed and thereby to remain permanently suspended in the coating composition.

6. A coating composition comprising a solution containing a cellulose ester and the reaction products obtained by mixing a solution of a non-alkali forming metal salt of a keto acid in an organic solvent with a solution in an organic solvent of a dye capable of forming a lake with the metal of the keto acid salt and an organic base in amount sufficient to neutralize the keto acid set free, said reaction products being characterized by their ability to remain dispersed in the solvents wherein they were formed and thereby to remain permanently suspended in the coating composition.

7. A method of producing a colored coating composition which comprises mixing a solution of a non-alkali forming metal salt of a keto acid in an organic solvent with a solution in an organic solvent of a dye capable of forming a lake with the metal of the salt, thereby producing a permanent dispersion of the reaction products in the solvents wherein they are formed, and dissolving an organic film forming plastic therein.

8. A method of producing a colored lacquer which comprises dissolving in alcohol a non-alkali forming metal salt of a keto aromatic acid and an organic base, adding a solution in alcohol of dye capable of forming a lake with the metal of the salt, thereby producing a permanent dispersion of the reaction products in the solvents wherein they are formed, and admixing this solution with a cellulose ester lacquer.

9. A method of producing a colored lacquer which comprises dissolving in alcohol a non-alkali forming metal salt of benzoyl benzoic acid and an ethanolamine, adding a solution in alcohol of a dye capable of forming a lake with the metal of the salt, thereby producing a permanent dispersion of the reaction products in alcohol, and admixing this solution with a cellulose ester lacquer.

LLOYD C. DANIELS.
ALPHONS O. JAEGER.